W. T. ROLLINS.
ANTISKID ATTACHMENT FOR RUBBER TIRED WHEELS.
APPLICATION FILED APR. 29, 1920.
1,364,319.
Patented Jan. 4, 1921.
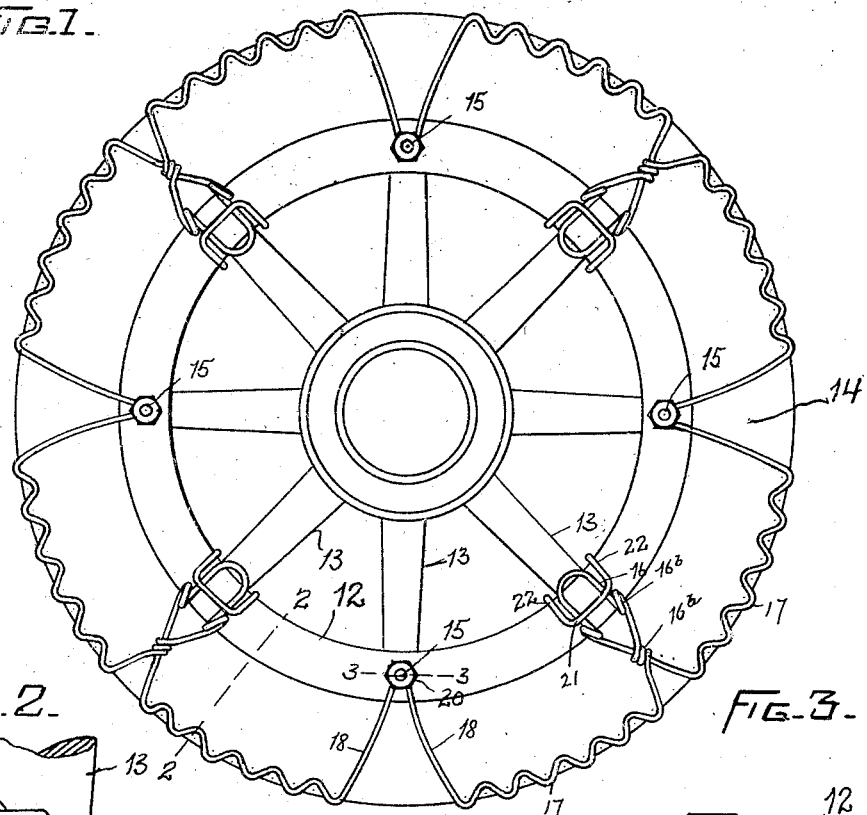
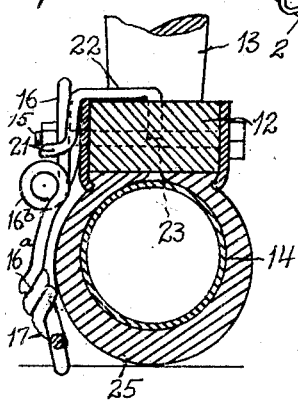
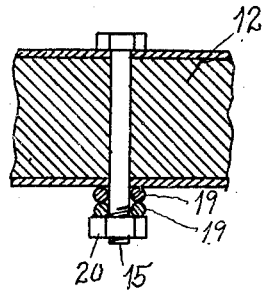
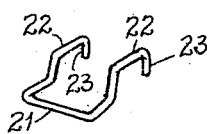
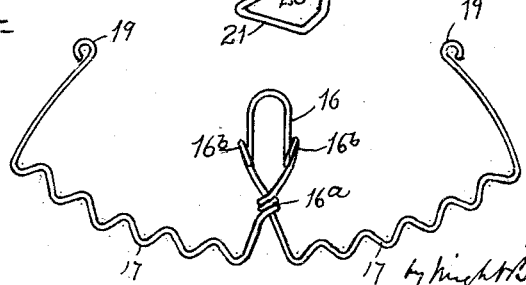
INVENTOR
W. T. Rollins
by Knight & Brown Lindley & Roy
ATT'YS.

UNITED STATES PATENT OFFICE.

WILLIAM T. ROLLINS, OF BOSTON, MASSACHUSETTS, ASSIGNOR OF ONE-HALF TO WILLIAM H. DAVIS, OF BROOKLINE, MASSACHUSETTS.

ANTISKID ATTACHMENT FOR RUBBER-TIRED WHEELS.

1,364,319. Specification of Letters Patent. Patented Jan. 4, 1921.

Application filed April 29, 1920. Serial No. 377,582.

*To all whom it may concern:*

Be it known that I, WILLIAM T. ROLLINS, a citizen of the United States, residing at Boston, in the county of Suffolk and State of Massachusetts, have invented new and useful Improvements in Antiskid Attachments for Rubber-Tired Wheels, of which the following is a specification.

This invention relates to vehicle wheels having rubber tires which are either pneumatic or cushioned, and has for its object to provide a protective attachment for such wheels, adapted to prevent the wheel from skidding, to prevent the tire from mushrooming when not in motion, to protect the tire against chafing against a curb, and to facilitate the passage of the tire over a street-car rail.

The invention is embodied in the improvements which I will now proceed to describe and claim.

Of the accompanying drawings, forming a part of this specification,—

Figure 1 is a side view of the felly and tire of a wheel equipped with an attachment embodying the invention.

Fig. 2 is a section on line 2—2 of Fig. 1.

Fig. 3 is a section on line 3—3 of Fig. 1.

Fig. 4 is a perspective view of one of the sections of the attachment.

Fig. 5 is a perspective view of the securing device which engages the central arm of the attachment.

The same reference characters indicate the same parts in all of the figures.

In the drawings, 12 represents a portion of the wooden felly, and 13 the spokes of a vehicle wheel equipped with a rubber tire 14, the wheel and tire being of any suitable construction, and forming no part of the present invention.

The felly is provided with bolts projecting laterally from its opposite sides, these being the usual bolts employed in securing the tire to the felly.

My improved attachment comprises a plurality of guard sections, preferably composed of stout wire rods, each section including a segmental portion, and arm portions adapted to bear on the outer side of the tire 14, and provided with means for detachably engaging attaching devices on the felly, said attaching devices including the usual bolts 15.

Each guard section is preferably constructed from a single length of wire or a wire rod, as shown by Figs. 1 and 4. The rod is bent to form a central looped arm portion 16, segmental portions 17 at opposite sides of said central arm portion, and end arm portions 18 at the outer ends of the segmental portions. The arm portions 18 are provided with eyes 19, adapted to receive two of the bolts 15, the usual nuts 20 with which said bolts are provided being employed to secure two eyes 19 on each bolt, as shown by Fig. 3. The central arm 16 is preferably twisted at $16^a$, and provided with coils $16^b$, the upper end of said portion being adapted to be engaged with a staple-shaped securing device composed of a central neck 21, and arms 22 formed to bear on the inner side of the felly 12, and provided with studs 23, adapted to enter sockets formed for their reception in the felly, as indicated by Fig. 2.

The described sections collectively constitute a sectional circular guard, concentric with the axis of the wheel, the segmental portions 17 being adapted to engage the road at the outer side of the tread portion of the tire to prevent skidding when the wheel is in motion, and to prevent mushrooming of the tire when the wheel is at rest. The segmental portions and the arms are adapted to protect the outer side of the tire against chafing contact with a curb.

The segmental portions 17 are preferably corrugated or sinuous, so that each presents a series of bends constituting teeth, adapted to engage a street-car rail and facilitate the passage of the wheel over the rail, said teeth also facilitating the engagement of the segmental portions with the road to prevent skidding.

As shown by Fig. 2, the segmental portions 17 preferably project sufficiently below the tread face of the tire 14 to engage the surface 25 of the road.

I claim:

1. An anti-skid attachment for rubber-tired wheels, comprising a plurality of guard sections, each including a segmental portion and arm portions thereon, adapted to bear on the outer side of a tire, and provided with means for detachably engaging attaching devices on a felly, said sections collectively constituting a sectional circular guard concentric with the axis of the wheel, and adapted to engage the road at the outer side of the tread portion of the tire, to prevent skidding and mushrooming of the tire, the attachment being also adapted to protect the outer side of the tire against chafing contact with a curb.

2. An anti-skid attachment substantially as specified by claim 1, the said segmental portions being corrugated or sinuous, and thereby adapted to engage street-car track rails.

3. An anti-skid attachment section composed of a rod bent to form a central looped arm portion, segmental portions at opposite sides of said central arm portion, and end arm portions at the outer ends of said segmental portions, each of said arm portions being formed to engage a securing device on a wheel felly, and to bear on the outer side of a tire thereon, and hold the segmental portions in position to engage the road.

4. An anti-skid attachment substantially as specified by claim 3, the end arms being provided with eyes adapted to receive laterally projecting bolts on a felly, and the central arm being formed to engage a retaining device on the felly between said bolts.

In testimony whereof I have affixed my signature.

WILLIAM T. ROLLINS.